(12) United States Patent
Yamauchi

(10) Patent No.: US 11,515,534 B2
(45) Date of Patent: *Nov. 29, 2022

(54) POSITIVE ELECTRODE ACTIVE MATERIAL FOR SODIUM-ION SECONDARY BATTERY

(71) Applicant: NIPPON ELECTRIC GLASS CO., LTD., Otsu (JP)

(72) Inventor: Hideo Yamauchi, Otsu (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/613,518

(22) PCT Filed: Jun. 12, 2018

(86) PCT No.: PCT/JP2018/022449
§ 371 (c)(1),
(2) Date: Nov. 14, 2019

(87) PCT Pub. No.: WO2019/003903
PCT Pub. Date: Jan. 3, 2019

(65) Prior Publication Data
US 2020/0075950 A1    Mar. 5, 2020

(30) Foreign Application Priority Data
Jun. 27, 2017 (JP) .............. JP2017-125018

(51) Int. Cl.
*H01M 4/00* (2006.01)
*H01M 4/525* (2010.01)
(Continued)

(52) U.S. Cl.
CPC .......... *H01M 4/525* (2013.01); *H01M 4/505* (2013.01); *H01M 10/054* (2013.01); *H01M 10/0562* (2013.01); *H01M 2004/028* (2013.01)

(58) Field of Classification Search
CPC .... H01M 4/525; H01M 4/505; H01M 10/054; H01M 10/0562; H01M 2004/028; H01M 4/5825; Y02E 60/10; C01B 25/45
See application file for complete search history.

(56) References Cited

U.S. PATENT DOCUMENTS

2007/0259271 A1   11/2007   Nanno et al.
2010/0183923 A1   7/2010    Okada et al.
(Continued)

FOREIGN PATENT DOCUMENTS

CN    101657919 A    2/2010
CN    104247103 A    12/2014
(Continued)

OTHER PUBLICATIONS

Official Communication issued in International Patent Application No. PCT/JP2018/022449, dated Aug. 21, 2018.
(Continued)

Primary Examiner — Nicholas P D'Aniello
(74) Attorney, Agent, or Firm — Keating and Bennett, LLP

(57) ABSTRACT

The present invention provides a novel positive electrode active material for a sodium-ion secondary battery having a high voltage and a high capacity. The positive electrode active material for a sodium-ion secondary battery contains, in terms of % by mole of oxide, 8 to 55% $Na_2O$, 10 to 70% CoO, 0 to 60% $CrO+FeO+MnO+NiO$, and 15 to 70% $P_2O_5+SiO_2+B_2O_3$ and also contains an amorphous phase.

13 Claims, 1 Drawing Sheet

(51) Int. Cl.
*H01M 4/505* (2010.01)
*H01M 10/054* (2010.01)
*H01M 10/0562* (2010.01)
*H01M 4/02* (2006.01)

(56) References Cited

U.S. PATENT DOCUMENTS

| | | | |
|---|---|---|---|
| 2011/0117415 A1* | 5/2011 | Saka | H01M 50/449 |
| | | | 429/224 |
| 2012/0228561 A1 | 9/2012 | Nagakane et al. | |
| 2014/0197358 A1 | 7/2014 | Nose | |
| 2015/0180024 A1 | 6/2015 | Nose | |
| 2015/0280215 A1 | 10/2015 | Nose | |
| 2015/0303470 A1 | 10/2015 | Honma et al. | |
| 2015/0303474 A1* | 10/2015 | Barker | C01B 25/45 |
| | | | 252/521.2 |
| 2017/0005337 A1 | 1/2017 | Ikejiri et al. | |
| 2017/0217774 A1* | 8/2017 | Ikejiri | H01M 4/58 |
| 2017/0346094 A1 | 11/2017 | Yamauchi | |
| 2018/0138505 A1 | 5/2018 | Honma et al. | |

FOREIGN PATENT DOCUMENTS

| | | | |
|---|---|---|---|
| CN | 104769757 A | 7/2015 | |
| CN | 106374102 A | 2/2017 | |
| CN | 106537667 A | 3/2017 | |
| CN | 106575766 A | 4/2017 | |
| JP | 2007-005279 A | 1/2007 | |
| JP | 2011-108440 A | 6/2011 | |
| JP | 2013-225495 A | 10/2013 | |
| JP | 2014-232569 A | 12/2014 | |
| JP | 2015-011943 A | 1/2015 | |
| JP | 5673836 B2 | 2/2015 | |
| JP | 2016-025067 A | 2/2016 | |
| JP | 2016-042453 A | 3/2016 | |
| JP | 2016-157674 A | 9/2016 | |
| WO | 2013/187160 A1 | 12/2013 | |
| WO | WO-2015087734 A1 * | 6/2015 | H01B 1/08 |
| WO | WO-2016031561 A1 * | 3/2016 | H01M 10/054 |
| WO | 2016/136555 A1 | 9/2016 | |

OTHER PUBLICATIONS

Official Communication issued in corresponding Chinese Patent Application No. 201880025212.1, dated Feb. 9, 2022.

* cited by examiner

[FIG. 1]
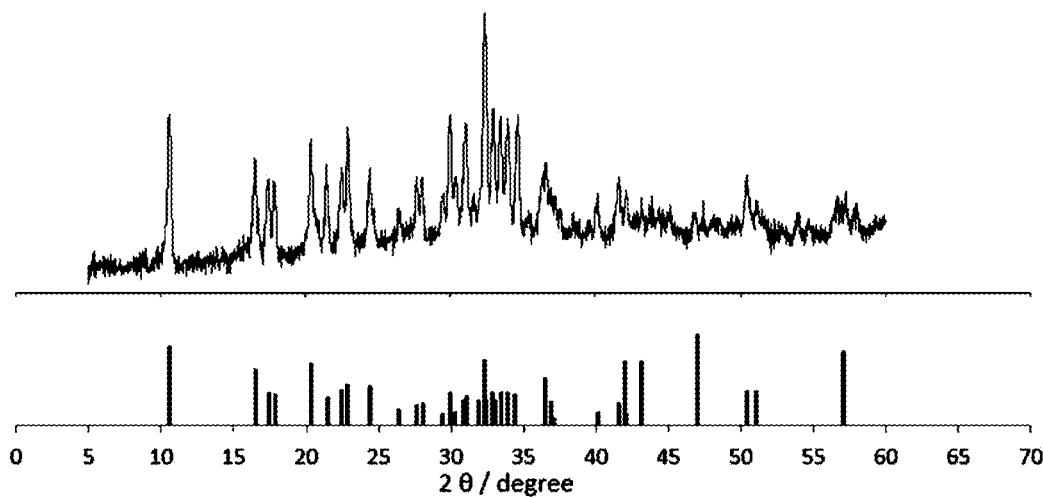
[FIG. 2]
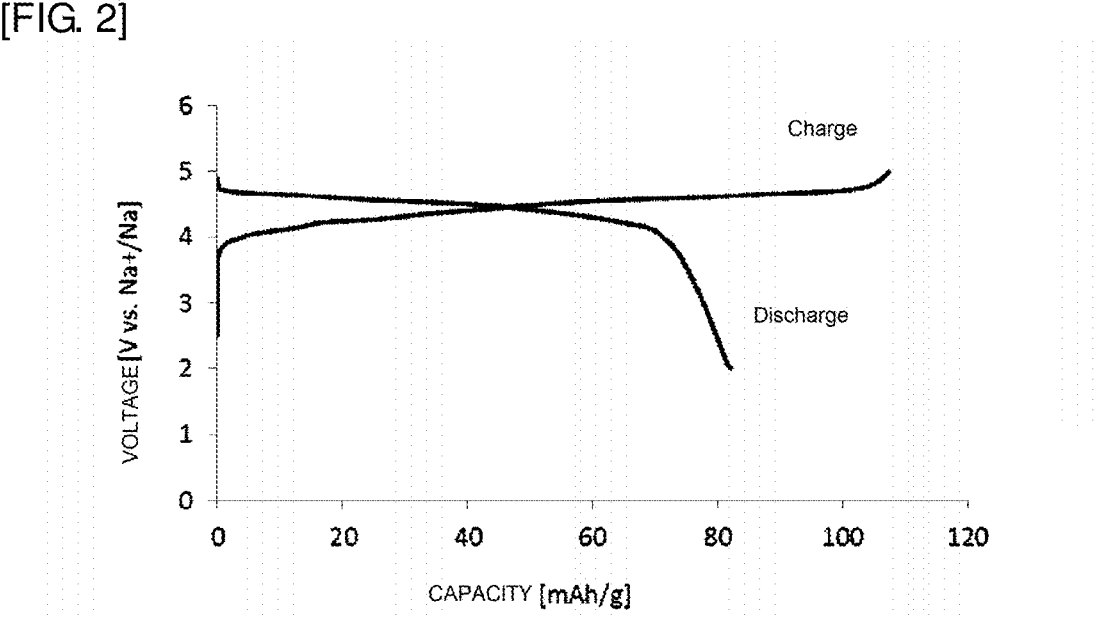

POSITIVE ELECTRODE ACTIVE MATERIAL FOR SODIUM-ION SECONDARY BATTERY

TECHNICAL FIELD

The present invention relates to positive electrode active materials for sodium-ion batteries used in portable electronic devices, electric vehicles, and so on.

BACKGROUND ART

Lithium-ion secondary batteries have secured their place as high-capacity and light-weight power sources essential for mobile electronic terminals, electric vehicles, and so on and attention has been focused, as their positive electrode active materials, on active materials containing olivine crystals represented by the general formula $LiFePO_4$. However, as for lithium, there are concerns about such issues as global rise in raw and processed material costs and, therefore, studies have recently been conducted on sodium-ion secondary batteries using, for example, $Na_2FeP_2O_7$ crystals or $Na_4Ni_3(PO_4)_2(P_2O_7)$ crystals, in which sodium is used as an alternative to lithium (see, for example, Patent Literatures 1 and 2).

CITATION LIST

Patent Literature

[PTL 1]
Japanese Patent No. 5673836
[PTL 2]
JP-A-2016-25067

SUMMARY OF INVENTION

Technical Problem

A positive electrode active material for a sodium-ion secondary battery, made of $Na_2FeP_2O_7$ crystals, has a problem with the discharge voltage being as low as about 2.9 V. On the other hand, a positive electrode active material for a sodium-ion secondary battery, made of $Na_4Ni_3(PO_4)_2(P_2O_7)$ crystals, has a relatively high discharge voltage, but has a problem of low discharge capacity.

In view of the above situations, the present invention has an object of providing a novel positive electrode active material for a sodium-ion secondary battery having a high voltage and a high capacity.

Solution to Problem

The inventor has found from intensive studies that the above problems can be solved by a positive electrode active material of a particular composition containing a Co component and proposes the positive electrode active material as the present invention.

Specifically, a positive electrode active material for a sodium-ion secondary battery according to the present invention has a feature of containing, in terms of % by mole of oxide, 8 to 55% $Na_2O$, 10 to 70% CoO, 0 to 60% CrO+FeO+MnO+NiO, and 15 to 70% $P_2O_5+SiO_2+B_2O_3$ and also containing an amorphous phase. Note that, herein, "(component)+(component)+ . . . " means the total content of the relevant components.

CoO changes the valence of Co ions during charge and discharge to cause a redox reaction and thus act as a drive force for absorption and release of sodium ions. Therefore, since the positive electrode active material contains a predetermined amount of CoO as an essential component as described above, the discharge capacity can be increased.

Also, since the positive electrode active material for a sodium-ion secondary battery according to the present invention has a feature of containing an amorphous phase, the diffusion path for sodium ions thus three-dimensionally expands, which facilitates insertion and extraction of sodium ions during charge and discharge and enables the capacity to be increased. In addition, rapid charge/discharge characteristics and cycle characteristics are likely to increase. In further addition, when the positive electrode active material is used as a positive electrode active material for a solid-state sodium-ion secondary battery, the amorphous phase softens and flows during firing to fusion bond the positive electrode active material and a sodium ion-conductive solid electrolyte together, so that a dense sintered body is likely to be formed. Therefore, an ion-conducting path is likely to be formed at the interface between the positive electrode active material and the solid electrolyte. The incorporation of amorphous in the positive electrode active material also offers an advantage that the decomposition of electrolyte by the positive electrode active material is likely to be inhibited.

The positive electrode active material for a sodium-ion secondary battery according to the present invention may contain crystals having a crystal form represented by a general formula $Na_xCo_{1-a}M_a)A_yO_z$ (where M represents at least one selected from the group consisting of Cr, Fe, Mn, and Ni, A represents at least one selected from the group consisting of P, Si, and B, $0.5 \leq x \leq 4.1$, $0.65 \leq y \leq 6.5$, $2.5 \leq z \leq 20$, and $0 \leq a \leq 0.9$). By doing so, the redox potential during charge and discharge is likely to be held constant at a high potential, so that the energy density is likely to increase.

In the positive electrode active material for a sodium-ion secondary battery according to the present invention, the crystals preferably have at least one crystal structure selected from monoclinic, triclinic, orthorhombic, and tetragonal crystal structures.

In the positive electrode active material for a sodium-ion secondary battery according to the present invention, the crystals preferably belong to at least one space group selected from P-1, P1, Cm, Pna21, and P21/n.

A positive electrode material for a sodium-ion secondary battery according to the present invention has a feature of containing the above-described positive electrode active material for a sodium-ion secondary battery.

The positive electrode material for a sodium-ion secondary battery according to the present invention preferably further contains a conductive agent.

The positive electrode material for a sodium-ion secondary battery according to the present invention preferably further contains a sodium ion-conductive solid electrolyte.

In the positive electrode material for a sodium-ion secondary battery according to the present invention, the sodium ion-conductive solid electrolyte is preferably beta-alumina or NASICON crystals.

The positive electrode material for a sodium-ion secondary battery according to the present invention preferably contains, in terms of % by mass, 30 to 100% the positive electrode active material for a sodium-ion secondary battery, 0 to 20% conductive agent, and 0 to 70 sodium ion-conductive solid electrolyte.

A positive electrode for a sodium-ion secondary battery according to the present invention has a feature that the above-described positive electrode material for a sodium-ion secondary battery is used therein.

A sodium-ion secondary battery according to the present invention has a feature of including the above-described positive electrode for a sodium-ion secondary battery.

A method for producing a positive electrode active material for a sodium-ion secondary battery according to the present invention is a method for producing the above-described positive electrode active material for a sodium-ion secondary battery and has a feature of including the steps of: melting a raw material batch to obtain a melt; and cooling the melt to obtain a glass body.

The method for producing the positive electrode active material for a sodium-ion secondary battery according to the present invention preferably further includes the step of firing the glass body to crystallize the glass body.

In the method for producing the positive electrode active material for a sodium-ion secondary battery according to the present invention, the glass body is preferably fired together with at least one selected from an electrically conductive carbon, a source of electrically conductive carbon, and a sodium ion-conductive solid electrolyte.

Advantageous Effects of Invention

The present invention enables provision of a novel positive electrode active material for a sodium-ion secondary battery having a high voltage and a high capacity.

BRIEF DESCRIPTION OF DRAWINGS

FIG. 1 is a chart showing an XRD pattern of sample No. 1 which is a working example.

FIG. 2 is first charge and first discharge curves of a solid-state sodium-ion secondary cell in which sample No. 1 as a working example is used.

DESCRIPTION OF EMBODIMENTS (Positive Electrode Active Material for Sodium-Ion Secondary Battery)

A positive electrode active material for a sodium-ion secondary battery according to the present invention has a feature of containing, in terms of % by mole of oxide, 8 to 55% $Na_2O$, 10 to 70% CoO, 0 to 60% CrO+FeO+MnO+NiO, and 15 to 70% $P_2O_5+SiO_2+B_2O_3$ and also containing an amorphous phase. Reasons why each of the components is limited as just described will be described below. Note that in the following description of the content of each component "%" refers to "% by mole" unless otherwise stated.

$Na_2O$ serves, during charge and discharge, as a supply source of sodium ions that move between the positive electrode active material and a negative electrode active material. The content of $Na_2O$ is 8 to 55%, preferably 15 to 45%, and particularly preferably 25 to 35%. If $Na_2O$ is too little, the amount of sodium ions contributing to absorption and release becomes small, so that the discharge capacity tends to decrease. On the other hand, if $Na_2O$ is too much, other crystals not contributing to charge and discharge, such as $Na_3PO_4$, are likely to precipitate, so that the discharge capacity tends to decrease.

CoO changes the valence of Co ions during charge and discharge to cause a redox reaction and thus act as a drive force for absorption and release of sodium ions. The content of CoO is 10 to 70%, preferably 30 to 45%, and particularly preferably 34 to 41%. If CoO is too little, a redox reaction during charge and discharge becomes less likely to occur, so that the amount of sodium ions to be absorbed and released becomes small and, therefore, the discharge capacity tends to decrease. On the other hand, if CoO is too much, other crystals tend to precipitate to decrease the discharge capacity.

CrO, FeO, MnO, and NiO, like CoO, change the valences of these transition metal element ions during charge and discharge to cause redox reactions and thus act as drive forces for absorption and release of sodium ions. MnO is preferred because it exhibits a particularly high redox potential. Furthermore, FeO is preferred because it has high structural stability during charge and discharge to make the cycle characteristics likely to increase. The content of CrO+FeO+MnO+NiO is 0 to 60%, preferably 0.1 to 50%, more preferably 0.5 to 45%, still more preferably 1 to 40%, yet still more preferably 3 to 30%, and particularly preferably 5 to 20%. If CrO+FeO+MnO+NiO is too much, other crystals not contributing to charge and discharge, such as FeO, MnO, and NiO, are likely to precipitate, so that the discharge capacity tends to decrease. Note that when priority is given to increasing the redox potential, it is preferred that the content of CrO+FeO+MnO+NiO be made as small as possible and the content of CoO be made larger.

Also note that the transition metal elements in CrO, FeO, MnO, and NiO are preferably low-valent ions, particularly divalent ions, in the glass. In this case, the redox potential generated during charge and discharge is likely to be high and the discharge capacity and discharge voltage are also likely to be high.

$P_2O_5$, $SiO_2$, and $B_2O_3$ form a three-dimensional network and, therefore, have the effect of stabilizing the structure of the positive electrode active material. In addition, when the positive electrode active material contains these components, it can increase the content of the amorphous phase. $P_2O_5$ and $SiO_2$ are particularly preferred because they have excellent ionic conductivity, and $P_2O_5$ is most preferred. The content of $P_2O_5+SiO_2+B_2O_3$ is 15 to 70%, preferably 28 to 40%, and particularly preferably 30 to 38%. If $P_2O_5+SiO_2+B_2O_3$ is too little, the discharge capacity after repeated charge and discharge tends to be likely to decrease. On the other hand, if $P_2O_5+SiO_2+B_2O_3$ is too much, other crystals not contributing to charge and discharge, such as $P_2O_5$, tend to precipitate. Note that the content of each component of $P_2O_5$, $SiO_2$, and $B_2O_3$ is preferably 0 to 70%, more preferably 15 to 70%, still more preferably 28 to 40%, and particularly preferably 30 to 38%.

$Na_2O$/CoO is preferably 0.2 to 5, more preferably 0.3 to 4, and particularly preferably 0.4 to 3. If $Na_2O$/CoO is too small or too large, the discharge capacity tends to decrease. Furthermore, $CoO/(P_2O_5+SiO_2+B_2O_3)$ is preferably 0.2 to 4, more preferably 0.3 to 3, and particularly preferably 0.4 to 2. If $CoO/(P_2O_5+SiO_2+B_2O_3)$ is too small or too large, the discharge capacity tends to decrease. Here, "$Na_2O$/CoO" means the molar ratio between the contents of $Na_2O$ and CoO. Furthermore, "$CoO/(P_2O_5+SiO_2+B_2O_3)$" means the molar ratio between the content of CoO and the content of $P_2O_5+SiO_2+B_2O_3$.

In addition to the above components, various components can be contained in the positive electrode active material so long as not impairing the effects of the present invention, which facilitates vitrification. Examples of these components include, in terms of oxides, MgO, CaO, SrO, BaO, ZnO, CuO, $Al_2O_3$, $GeO_2$, $Nb_2O_5$, $ZrO_2$, $V_2O_5$, and $Sb_2O_5$. $Al_2O_3$ acting as a network forming oxide and $V_2O_5$ serving as an active material component are particularly preferred. The content of the above components is, in total, preferably 0 to 30%, more preferably 0.1 to 20%, and particularly preferably 0.5 to 10%.

The positive electrode active material for a sodium-ion secondary battery according to the present invention has a feature of containing an amorphous phase. Thus, the positive electrode active material can enjoy the effects as described previously, including a capacity increase and increases in rapid charge/discharge characteristics and cycle characteristics.

The positive electrode active material for a sodium-ion secondary battery according to the present invention may contain crystals (operating voltage: 4 to 6V (vs. Na/Na$^+$) represented by the general formula Na$_x$(Co$_{1-a}$M$_a$)A$_y$O$_z$ (where M represents at least one selected from the group consisting of Cr, Fe, Mn, and Ni, A represents at least one selected from the group consisting of P, Si, and B, $0.5 \leq x \leq 4.1$, $0.65 \leq y \leq 6.5$, $2.5 \leq z \leq 20$, and $0 \leq a \leq 0.9$). By doing so, the redox potential during charge and discharge is likely to be held constant at a high potential, so that the energy density is likely to increase.

The value x is preferably in a range of $0.5 \leq x \leq 4.1$, more preferably $0.5 \leq x \leq 4$, still more preferably $1.2 \leq x \leq 3.5$, yet still more preferably $1.35 \leq x \leq 2.5$, and particularly preferably $1.4 \leq x \leq 1.95$. If the value x is too small, the amount of sodium ions contributing to absorption and release becomes small, so that the discharge capacity tends to decrease. On the other hand, if the value x is too large, other crystals not contributing to charge and discharge, such as Na$_3$PO$_4$, are likely to precipitate, so that the discharge capacity tends to decrease.

The value y is preferably in a range of $0.65 \leq y \leq 6.5$, more preferably $1.1 \leq y \leq 4$, still more preferably $1.35 \leq y \leq 2$, and particularly preferably $1.4 \leq y \leq 1.9$. If the value y is too small, the amount of matrix component enveloping transition metal elements becomes small, so that the capacity after repeated charge and discharge tends to be likely to decrease. On the other hand, if the value y is too large, other crystals not involved in charge and discharge, such as P$_2$O$_5$, precipitate, so that the capacity tends to decrease.

The value z is preferably in a range of $2.5 \leq z \leq 20$, more preferably $3.5 \leq z \leq 15$, still more preferably $5 < z < 7$, and particularly preferably $5.7 \leq z < 7$. If the value z is too small, the valence of the transition metal element becomes smaller than two, so that the transition metal element is likely to precipitate as a metal during charge and discharge. The precipitated metal elutes into an electrolytic solution and precipitates in the form of a metal dendrite on the negative electrode side, which may cause an internal short-circuit. In addition, if the value z is too small, sodium ions become less released or a redox reaction of the transition metal becomes less likely to occur, so that the discharge capacity tends to decrease. On the other hand, if the value z is too large, the transition metal element becomes higher in valency than divalent and its redox reaction during charge and discharge becomes less likely to occur, so that the amount of sodium ions to be absorbed and released becomes small and, therefore, the discharge capacity is likely to decrease.

M representing a transition metal element may be at least one selected from the group consisting of Cr, Fe, Mn, and Ni. When M is Ni or Mn, this is preferred because Ni and Mn exhibit particularly high redox potentials. Particularly preferred is Ni because it has a high operating voltage. Furthermore, when M is Fe, this is preferred because Fe has high structural stability during charge and discharge to make the cycle characteristics likely to increase.

The value a is preferably $0 \leq a \leq 0.9$, more preferably $0 \leq a \leq 0.5$, still more preferably $0 \leq a \leq 0.3$, and particularly preferably $a = 0$. As the value a is smaller, the redox potential becomes higher, so that when the positive electrode active material is used for a power storage device, it is likely to exhibit a high charge/discharge voltage.

A has a role as an element for forming a skeleton of a crystal structure as a network forming component and may be at least one selected from the group consisting of P, Si, and B. P and Si are preferred because they have excellent structural stability, and P is particularly preferred because it has excellent ionic conductivity.

The crystals represented by the general formula Na$_x$Co$_{1-a}$M$_a$A$_y$O$_z$ preferably have either one of monoclinic, triclinic, orthorhombic, and tetragonal crystal structures, and, particularly, the triclinic crystal structure having excellent structural stability is preferred because it has excellent cycle characteristics. Furthermore, the crystals preferably belong to at least one space group selected from P-1, P1, Cm, Pna21, and P21/n, and particularly preferably belong to P-1 or P1.

Specific examples of the type of crystal include NaCoPO$_4$ (theoretical capacity: 152 mAh/g, tetragonal P65), Na$_2$CoSiO$_4$ (theoretical capacity: 136 mAh/g, monoclinic Pn), Na$_4$Co$_3$(PO$_4$)$_2$(P$_2$O$_7$) (=Na$_{1.33}$CoP$_{1.33}$O$_5$, theoretical capacity: 127 mAh/g, orthorhombic Pna21), Na$_{3.12}$Co$_{2.44}$(P$_2$O$_7$)$_2$ (=Na$_{1.28}$CoP$_{1.64}$O$_{5.74}$, theoretical capacity: 116 mAh/g, triclinic P-1), Na$_4$Co$_5$(PO$_4$)$_2$(P$_2$O$_7$)$_2$ (=Na$_{0.8}$CoP$_{1.2}$O$_{4.4}$, theoretical capacity: 116 mAh/g, monoclinic P21/c), Na$_{3.64}$Co$_{2.18}$(P$_2$O$_7$)$_2$ (=Na$_{1.67}$CoP$_{1.83}$O$_{6.42}$, theoretical capacity: 104 mAh/g, triclinic P-1), Na$_{5.6}$Co$_4$P$_8$O$_{28}$ (=Na$_{1.4}$CoP$_2$O$_7$, theoretical capacity: 103 mAh/g, triclinic P-1), Na$_4$Co$_7$(PO$_4$)$_6$ (=Na$_{0.57}$CoP$_{0.86}$O$_{3.43}$, theoretical capacity: 100 mAh/g, monoclinic Cm), Na$_2$Co(P$_2$O$_7$) (theoretical capacity: 96 mAh/g, tetragonal P42/mnm, orthorhombic Pna21 or P21cn, triclinic P1 or P-1), Na$_9$Co$_3$(PO$_4$)$_5$ (=Na$_3$CoP$_{1.67}$O$_{6.67}$, theoretical capacity: 94 mAh/g), Na$_2$Co$_2$(B$_{12}$O$_{21}$) NaCoB$_6$O$_{10.5}$, theoretical capacity: 85 mAh/g, monoclinic I2/a), Na$_2$Co(Si$_4$O$_{10}$ (theoretical capacity: 71 mAh/g, triclinic P-1), Na$_3$Co$_9$(PO$_4$)$_7$ (=Na$_{0.33}$CoP$_{0.78}$O$_{3.11}$, theoretical capacity: 64 mAh/g), NaCo$_4$(PO$_4$)$_3$ (=Na$_{0.25}$CoP$_{0.75}$O$_3$, theoretical capacity: 49 mAh/g, monoclinic P21/n), and Na$_4$Co(PO$_3$)$_6$ (theoretical capacity: 43 mAh/g, triclinic P-1). Note that the expressions of the above crystals are rational formulas and the formulas described in parentheses represent general formulas where the factor of Co in each rational formula is normalized to 1. When the general formula has the same expression as the rational formula, its description is omitted.

Among them, Na$_{3.12}$Co$_{2.44}$(P$_2$O$_7$)$_2$, Na$_{3.64}$Co$_{2.18}$(P$_2$O$_7$)$_2$, Na$_{5.6}$Co$_4$P$_8$O$_{28}$, and Na$_2$Co(P$_2$O$_7$) are preferred, Na$_{3.64}$Co$_{2.18}$(P$_2$O$_7$)$_2$ and Na$_{5.6}$Co$_4$P$_8$O$_{28}$ are particularly preferred because of their high capacities and excellent cycle stability, and Na$_{3.64}$Co$_{2.18}$(P$_2$O$_7$)$_2$ is most preferred because of its more excellent cycle stability.

The crystals may be precipitated in only one of the above types of crystals (i.e., in a single phase) or may be precipitated in two or more types (i.e., in the form of mixed crystals). Alternatively, it is possible that one or more of the above types of crystals are precipitated as a main crystal (main crystals) and one or more types of crystals other than the above are also precipitated.

As the crystallite size of the crystals is smaller, the average particle diameter of the positive electrode active material particles can be made smaller, so that the electrical conductivity can be more increased. Specifically, the crystallite size is preferably 100 nm or less and particularly preferably 80 nm or less. The lower limit of the crystallite size is not particularly limited but is, actually, preferably not less than 1 nm and more preferably not less than 10 nm. The crystallite size can be determined from analysis results of powder X-ray diffraction of the crystals according to the Scherrer equation.

The contents of the amorphous phase and the crystals in the positive electrode active material are preferably appropriately selected depending on desired properties. For example, the content of the amorphous phase in the positive electrode active material is, in terms of % by mass, preferably 0.1% or more, more preferably 1% or more, still more preferably 5% or more, yet still more preferably 10% or more, yet still more preferably 20% or more, yet still more preferably 30% or more, yet still more preferably 50% or more, yet still more preferably 70% or more, and particularly preferably 90% or more (i.e., the content of the crystals is, in terms of % by mass, preferably 99.9% or less, more preferably 99% or less, still more preferably 95% or less, yet still more preferably 90% or less, yet still more preferably 80% or less, yet still more preferably 70% or less, yet still more preferably 50% or less, yet still more preferably 30% or less, and particularly preferably 10% or less). If the content of the amorphous phase is too small, the previously described effects are less likely to be achieved. Note that when the proportion of amorphous in the positive electrode active material increases, the flexibility of composition design becomes high as compared to a positive electrode active material composed of crystals, so that an advantage is provided that a voltage increase and a capacity increase are likely to be achieved by appropriately adjusting the composition (for example, increasing the content of transition metal components). The upper limit of the content of the amorphous phase is not particularly limited and may be 100% (i.e., the content of crystals may be 0%). However, in positively precipitating the crystals, the upper limit of the content of the amorphous phase may be preferably not more than 99.9%, more preferably not more than 99%, still more preferably not more than 95%, yet still more preferably not more than 90%, yet still more preferably not more than 80%, yet still more preferably not more than 70%, yet still more preferably not more than 50%, yet still more preferably not more than 30%, and particularly preferably not more than 10% (i.e., the content of the crystals may be, in terms of % by mass, preferably not less than 0.1%, more preferably not less than 1%, still more preferably not less than 5%, yet still more preferably not less than 10%, yet still more preferably not less than 20%, yet still more preferably not less than 30%, yet still more preferably not less than 50%, yet still more preferably not less than 70%, and particularly preferably not less than 90%). By doing so, the previously described effect to be achieved by incorporation of the crystals can be simultaneously enjoyed.

The contents of the amorphous phase and the crystals in the positive electrode active material can be determined by using a diffraction line profile at 2θ values of 10 to 60° obtained by powder X-ray diffraction measurement using CuKα rays and making a peak separation from the profile into crystalline diffraction lines and an amorphous halo. Specifically, the background is subtracted from the diffraction line profile to obtain a total scattering curve, a broad diffraction curve (amorphous halo) at 10 to 50° is peak-separated from the total scattering curve and integrated, the obtained integrated intensity of the halo is represented as Ia, crystalline diffraction lines of a crystalline phase detected at 10 to 60° and represented by the previously described general formula are peak-separated from the total scattering curve and integrated, the sum of the obtained integrated intensities of the crystalline diffraction lines is represented as Ic, and the sum of integrated intensities determined from the crystalline diffraction lines derived from the other types of crystals is represented as Io. In this case, the content Xg of the amorphous phase and the content Xc of the crystals can be determined from the following equations.

$$Xg=[Ia/(Ic+Ia+Io)]\times 100 (\text{\% by mass})$$

$$Xc=[Ic/(Ic+Ia+Io)]\times 100 (\text{\% by mass})$$

The positive electrode active material for a power storage device according to the present invention may be coated or formed into a composite with electrically conductive carbon. By doing so, the electronic conductivity becomes high and, thus, the rapid charge/discharge characteristics are likely to increase.

Examples of the electrically conductive carbon that can be used include carbon powders, carbon fibers and other types of carbons, such as highly electrically conductive carbon blacks such as acetylene black and Ketjenblack, and graphite. Preferred among them is acetylene black because of its high electronic conductivity.

An example of a method for coating the positive electrode active material with an electrically conductive carbon is a method of mixing the positive electrode active material with an organic compound which is a source of the electrically conductive carbon and then firing the mixture in an inert or reducing atmosphere to carbonize the organic compound. Any material may be used as the organic compound so far as it can remain as carbon in the process of heat treatment, but glucose, citric acid, ascorbic acid, phenolic resin, a surfactant or the like is preferably used, and a surfactant is particularly preferred because it is easily adsorbable on the surface of the positive electrode active material. The surfactant may be any of a cationic surfactant, an anionic surfactant, an amphoteric surfactant, and a non-ionic surfactant, but a non-ionic surfactant is particularly preferred because of its excellent adsorbability on the surface of the positive electrode active material.

The mixing ratio between the positive electrode active material and the electrically conductive carbon is, in terms of mass ratio, preferably 80-99.5:0.5-20 and more preferably 85-98:2-15. If the content of the electrically conductive carbon is too small, the electronic conductivity tends to be poor. On the other hand, if the content of the electrically conductive carbon is too large, the content of the positive electrode active material becomes relatively small and, therefore, the discharge capacity tends to decrease.

Note that when the surface of the positive electrode active material is coated with an electrically conductive carbon, the thickness of the electrically conductive carbon coating is preferably 1 to 100 nm and particularly preferably 5 to 80 nm. If the thickness of the electrically conductive carbon coating is too small, the electrically conductive carbon coating is likely to be lost in the process of charging/discharging to deteriorate the battery characteristics. On the other hand, if the thickness of the electrically conductive carbon coating is too large, a decrease in discharge capacity, a voltage drop, and so on are likely to occur.

In the positive electrode active material for a sodium-ion secondary battery according to the present invention, the ratio (D/G) of a peak intensity D between 1300 and 1400 $cm^{-1}$ to a peak intensity G between 1550 and 1650 $cm^{-1}$, both measured by Raman spectroscopy, is preferably 1 or less and particularly preferably 0.8 or less, and the ratio (F/G) of a peak intensity F between 800 to 1100 $cm^{-1}$ to the peak intensity G is preferably 0.5 or less and particularly preferably 0.1 or less. When these peak intensity ratios satisfy the above ranges, the electronic conductivity of the positive electrode active material tends to be high.

No particular limitation is placed on the form of the positive electrode active material for a power storage device, but a powdered form is preferred because the number of sites for absorption and release of sodium ions is increased. In this case, its average particle diameter is preferably 0.1 to 20 µm, more preferably 0.3 to 15 µm, still more preferably 0.5 to 10 µm, and particularly preferably 0.6 to 5 µm. Furthermore, its maximum particle diameter is preferably 150 µm or less, more preferably 100 µm or less, still more preferably 75 µm or less, and particularly preferably 55 µm or less. If the average particle diameter or maximum particle diameter is too large, the number of sites for absorption and release of sodium ions during charge and discharge becomes small and, therefore, the discharge capacity tends to decrease. On the other hand, if the average particle diameter is too small, the dispersed state of powder when the positive electrode active material is produced in paste form tends to be poor, which makes it difficult to produce a uniform electrode.

Herein, the average particle diameter and the maximum particle diameter refer to a median primary particle diameter $D_{50}$ (diameter at 50% cumulative volume) and a median primary particle diameter $D_{99}$ (diameter at 99% cumulative volume), respectively, and are values measured by a laser diffraction particle size distribution measurement device.

(Method for Producing Positive Electrode Active Material for Sodium-Ion Secondary Battery)

The positive electrode active material for a sodium-ion secondary battery according to the present invention can be produced by a melt-quenching process as described below. First, powders of raw materials are formulated to give a desired composition, thus obtaining a raw material batch. Next, the obtained raw material batch is melted. The melting temperature need only be appropriately adjusted so that the raw material batch becomes homogeneous. Specifically, the melting temperature is preferably 800° C. or more, more preferably 900° C. or more, and particularly preferably 1000° C. or more. The upper limit of the melting temperature is not particularly limited. However, because an excessively high melting temperature causes evaporation of the sodium component or energy loss, the upper limit thereof is preferably not more than 1500° C. and particularly preferably not more than 1400° C.

Meanwhile, in the case where the positive electrode active material contains an Fe component, the release of sodium ions during a first charge results in progress of an oxidation reaction of $Fe^{2+} \rightarrow Fe^{3+}$ as charge compensation. Therefore, if the proportion of divalent ions in the positive electrode active material is increased, the above oxidation reaction for charge compensation becomes likely to occur to easily increase the first charge/discharge efficiency. However, glass containing divalent Fe ions (FeO) is likely to change the oxidation state of Fe atoms depending on the melting conditions and its melting in an air atmosphere is likely to cause oxidation of the divalent Fe ions into trivalent Fe ions ($Fe_2O_3$). To cope with this, the melting is conducted in a reducing atmosphere or an inert atmosphere. Thus, the increase in valence of Fe ions in glass can be inhibited, so that a power storage device having an excellent first charge/discharge efficiency can be obtained.

For the melting in a reducing atmosphere, it is preferred to supply a reducing gas into a melting bath. In using $H_2$ gas as the reducing gas, it is preferred, for reduction in the risks of explosion and the like during melting, to use a mixed gas in which an inert gas, such as $N_2$, is added to $H_2$ gas. Specifically, the mixed gas preferably contains, in terms of % by volume, 90 to 99.5% $N_2$ and 0.5 to 10% $H_2$ and more preferably contains, in terms of % by volume, 92 to 99% $N_2$ and 1 to 8% $H_2$. For the melting in an inert atmosphere, it is preferred to supply an inert gas into a melting bath. The preferred inert gas to be used is nitrogen, argon or helium. The reducing gas or the inert gas may be supplied into an atmosphere located above the molten glass in the melting bath or may be supplied directly into the molten glass through a bubbling nozzle or both of these approaches may be concurrently used.

In the case where the positive electrode active material contains P, the use of a phosphate, such as sodium metaphosphate ($NaPO_3$) or sodium tertiary phosphate ($Na_3PO_4$), as a powder of the starting material makes it easy to obtain a positive electrode active material containing less devitrified foreign matter and having excellent homogeneity. With the use of this positive electrode active material as a positive electrode material, a secondary battery having a stable discharge capacity is likely to be obtained.

A resultant melt is cooled and formed into a shape, thus obtaining a glass body. No particular limitation is placed on the method for forming the melt into a shape and, for example, the melt may be formed into a film with rapid cooling by pouring the melt between a pair of cooling rolls or formed into an ingot by casting the melt into a mold. The glass body is preferably an amorphous body from the viewpoint of homogeneity, but may partly contain a crystalline phase.

Note that when the glass body contains trivalent Fe ions, the trivalent Fe ions are preferably reduced to divalent Fe ions, for example, by firing in a reducing atmosphere. Examples of the reducing atmosphere include atmospheres containing at least one reducing gas selected from $H_2$, $NH_3$, CO, $H_2S$, and $SiH_4$. From the viewpoint of efficiently reducing Fe ions in the glass body from trivalent ions to divalent ions, $H_2$, $NH_3$ or CO is preferred and $H_2$ is particularly preferred. In using $H_2$, it is preferred, for reduction in the risks of explosion and the like during firing, to use a mixed gas of $N_2$ and $H_2$. The mixed gas preferably contains, in terms of % by volume, 90 to 99.9% $N_2$ and 0.1 to 10% $H_2$, more preferably contains 90 to 99.5% $N_2$ and 0.5 to 10% $H_2$, and still more preferably contains 92 to 99% $N_2$ and 1 to 4% $H_2$.

The firing temperature (maximum temperature) is preferably equal to or higher than the glass transition point of the glass body, specifically, preferably 350 to 900° C., more preferably 400 to 850° C., still more preferably 425 to 800° C., and particularly preferably 450 to 750° C. If the firing temperature is too low, the reduction of Fe ions tends to be insufficient. On the other hand, if the firing temperature is too high, the glass body particles are fusion bonded together to decrease the specific surface area, so that the discharge capacity of the positive electrode active material tends to decrease.

The maximum temperature holding time during firing is preferably 10 to 600 minutes and particularly preferably 30 to 120 minutes. If the holding time is too short, the amount of heat energy given is small, so that the reduction of Fe ions tends to be insufficient. On the other hand, if the holding time is too long, the glass body particles are fusion bonded together to decrease the specific surface area, so that the discharge capacity of the positive electrode active material tends to decrease.

The glass body obtained in the above manner may be fired and thereby crystallized. Thus, a positive electrode active material having both of an amorphous phase and a crystalline phase can be obtained.

The firing temperature for crystallization is preferably equal to or higher than the glass transition temperature and more preferably equal to or higher than the crystallization temperature. The glass transition temperature and the crystallization temperature can be determined from DSC (differential scanning calorimetry) or DTA (differential thermal analysis). If the firing temperature is too low, the precipitation of the crystalline phase tends to be insufficient. On the other hand, if the firing temperature is too high, the glass body particles are fusion bonded together to decrease the specific surface area, so that the discharge capacity of the positive electrode active material tends to decrease. Therefore, the firing temperature is preferably 900° C. or below, more preferably 800° C. or below, still more preferably 700° C. or below, and particularly preferably 600° C. or below.

The firing time is appropriately adjusted so that the crystallization of the glass body sufficiently progresses. Specifically, the firing time is preferably 20 to 300 minutes and more preferably 30 to 240 minutes.

For the above firing, an electric heating furnace, a rotary kiln, a microwave heating furnace, a high-frequency heating furnace, or other furnaces can be used. Note that the Fe ion reduction and crystallization of the glass body may be concurrently performed.

Furthermore, if necessary, the positive electrode active material may be given electrical conductivity by mixing the glass body and an electrically conductive carbon while grinding them. An example of a method for mixing them with grinding is a method in which a general grinder is used, such as a mortar, a mortar mixer, a ball mill, an attritor, a vibrating ball mill, a satellite ball mill, a planetary ball mill, a jet mill or a bead mill. Preferred among them is the use of a planetary ball mill. The planetary ball mill has a structure in which a disk rotates while pots thereon rotate, so that very high impact energy can be efficiently produced. Thus, the electrically conductive carbon can be dispersed homogeneously into the glass body to increase the electronic conductivity.

Moreover, as described previously, the glass body may be coated with an electrically conductive carbon by mixing the glass body with an organic compound which is a source of the electrically conductive carbon and then firing the mixture in an inert or reducing atmosphere to carbonize the organic compound. This firing may be conducted concurrently with a heat treatment process for reducing Fe ions or a heat treatment process for crystallizing the glass body.

When a positive electrode active material is produced by a general solid reaction process, the charge/discharge potential may be undesirably excessively increased. Therefore, when the positive electrode active material is applied to a sodium-ion secondary battery in which a nonaqueous electrolytic solution is used as an electrolyte, the charge/discharge potential may reach the decomposition potential of the electrolytic solution. As a result, with repeated charge and discharge cycles, decreases in discharge capacity and charge/discharge efficiency resulting from the decomposition of the electrolytic solution are more likely to occur. Furthermore, the positive electrode active material obtained by the solid reaction process generally contains no amorphous and is, therefore, less likely to enjoy the previously described effects of the present invention that would be obtained if it contained amorphous.

(Positive Electrode Material for Sodium-Ion Secondary Battery)

A positive electrode material for a sodium-ion secondary battery can be obtained by mixing the positive electrode active material for a sodium-ion secondary battery according to the present invention with a conductive agent, a binder, and so on.

Examples of the conductive agent include powdered or fibrous electrically conductive carbons, such as highly electrically conductive carbon blacks such as acetylene black and Ketjenblack, and graphite. Preferred among them is acetylene black because it can increase the electrical conductivity even when added in small amount.

The binder is a component to be added to a positive electrode active material in order to bind together materials forming a positive electrode material and prevent the positive electrode active material from peeling from the positive electrode due to a volume change during charge and discharge. Specific examples of the binder include thermoplastic straight-chain polymers, such as polytetrafluoroethylene (PTFE), poly(vinylidene fluoride) (PVDF), fluorine-containing rubbers, and styrene-butadiene rubber (SBR); thermosetting resins, such as thermosetting polyimide, polyamide-imide, polyamide, phenolic resin, epoxy resin, urea resin, melamine resin, unsaturated polyester resin, and polyurethane; cellulose derivatives, such as carboxymethyl cellulose (including salts of carboxymethyl cellulose, such as sodium carboxymethyl cellulose, the same applies hereafter), hydroxypropylmethyl cellulose, hydroxypropyl cellulose, hydroxyethyl cellulose, ethyl cellulose, and hydroxymethyl cellulose; and water-soluble polymers, such as polyvinyl alcohol, polyacrylamide, polyvinyl pyrrolidone, and their copolymers. Among them, thermosetting resins, cellulose derivatives, and water-soluble polymers are preferred because of their excellent binding properties and thermosetting polyimide or carboxymethyl cellulose is more preferred because of their industrially widespread use. Particularly, carboxymethyl cellulose is most preferred because it is inexpensive and has such low environmental burden that it does not need any organic solvent in preparing a paste for electrode formation. These binders may be used singly or in a mixture of two or more of them.

In using the positive electrode active material for a sodium-ion secondary battery according to the present invention as a solid-state sodium-ion secondary battery, a sodium ion-conductive solid electrolyte is preferably added as a component of the positive electrode material for a sodium-ion secondary battery. The sodium ion-conductive solid electrolyte is a component that plays a role in conducting sodium ions between a positive electrode and a negative electrode in an all-solid-state power storage device. The sodium ion-conductive solid electrolyte is preferably beta-alumina or NASICON crystals because they have excellent sodium-ion conductivity. Beta-alumina includes two types of crystals: β alumina (theoretical composition formula: $Na_2O \cdot 11Al_2O_3$) and β" alumina (theoretical composition formula: $Na_2O \cdot 5.3Al_2O_3$). Because β" alumina is a metastable material, it is generally used in a state in which $Li_2O$ or MgO is added as a stabilizing agent thereto. Because β" alumina has a higher sodium-ion conductivity than β alumina, β" alumina alone or a mixture of β" alumina and β alumina is preferably used and $Li_2O$-stabilized β" alumina ($Na_{1.6}Li_{0.34}Al_{10.66}O_{12}$) or MgO-stabilized β" alumina (($Al_{10.32}Mg_{0.68}O_{16}$) ($Na_{1.68}O$)) is more preferably used.

Preferred examples of the NASICON crystal include $Na_3Zr_2Si_2PO_{12}$, $Na_{3.2}Zr_{1.3}Si_{2.2}P_{0.8}O_{100.5}$, $Na_3Zr_{1.6}Ti_{0.4}Si_2PO_{12}$, $Na_3Hf_2Si_2PO_{12}$, $Na_{3.4}Zr_{0.9}Hf_{1.4}Al_{0.6}Si_{1.2}P_{1.8}O_{12}$, $Na_3Zr_{1.2}Nb_{0.24}Si_2PO_{12}$, $Na_{3.6}Ti_{0.2}Y_{0.8}Si_{2.2}O_9$, $Na_3Zr_{1.88}Y_{0.12}Si_2PO_{12}$, $Na_{3.12}Zr_{1.88}Y_{0.12}Si_2PO_{12}$, and $Na_{3.6}Zr_{0.13}Yb_{1.67}Si_{0.11}P_{2.9}O_{12}$ and the particularly preferred is $Na_{3.12}Zr_{1.88}Y_{0.12}Si_2PO_{12}$ because it has excellent sodium-ion conductivity.

The average particle diameter $D_{50}$ of the sodium ion-conductive solid electrolyte is preferably 0.3 to 25 μm, more preferably 0.5 to 20 μm, and particularly preferably 1.2 to 15 μm. If the average particle diameter $D_{50}$ of the sodium ion-conductive solid electrolyte is too small, not only the sodium ion-conductive solid electrolyte becomes difficult to uniformly mix with the positive electrode active material, but also becomes likely to decrease the ionic conductivity because it absorbs moisture or becomes carbonated. As a result, the internal resistance tends to increase to decrease the charge/discharge voltage and discharge capacity. On the other hand, if the average particle diameter $D_{50}$ of the sodium ion-conductive solid electrolyte is too large, this significantly inhibits the softening and flow of the positive electrode active material during firing for the formation of a positive electrode layer, so that the resultant positive electrode layer tends to have poor smoothness to decrease the mechanical strength and tends to increase the internal resistance.

The composition of the positive electrode material is preferably appropriately selected depending on the type of electrolyte used. For example, in a sodium-ion secondary battery in which an aqueous or nonaqueous liquid electrolyte is used, the positive electrode material preferably contains, in terms of % by mass, 70 to 95% positive electrode active material, 1 to 15% conductive agent, and 3 to 15% binder and more preferably contains 80 to 95% positive electrode active material, 2 to 10% conductive agent, and 3 to 10% binder. If the content of positive electrode active material is too small, the discharge capacity of the sodium-ion secondary battery is likely to decrease. If the content of positive electrode active material is too large, the contents of conductive agent and binder become relatively small, so that the electronic conductivity and cycle characteristics are likely to decrease. If the content of conductive agent is too small, the electronic conductivity tends to be poor. If the content of conductive agent is too large, the bindability between the components of the positive electrode material decreases to increase the internal resistance and, therefore, the charge/discharge voltage and discharge capacity tend to decrease. If the content of binder is too small, the bindability between the components of the positive electrode material decreases, so that the cycle characteristics are likely to decrease. If the content of binder is too large, the electronic conductivity decreases and, therefore, the rapid charge/discharge characteristics are likely to decrease.

In the case of a solid-state sodium-ion secondary battery in which a sodium ion-conductive solid electrolyte is used as the electrolyte, the positive electrode material preferably contains, in terms of % by mass, 30 to 100% positive electrode active material, 0 to 20% conductive agent, and 0 to 70% solid electrolyte, more preferably contains, 34.5 to 94.5% positive electrode active material, 0.5 to 15% conductive agent, and 5 to 65% solid electrolyte, and still more preferably contains 40 to 92% positive electrode active material, 1 to 10% conductive agent, and 7 to 50% solid electrolyte. If the content of positive electrode active material is too small, the discharge capacity of the sodium-ion secondary battery is likely to decrease. If the content of conductive agent or solid electrolyte is too large, the bindability between the components of the positive electrode material decreases to increase the internal resistance and, therefore, the charge/discharge voltage and discharge capacity tend to decrease.

The mixing of the components of the positive electrode material can be made using a mixer, such as a planetary centrifugal mixer or a tumbler mixer, or a general grinder, such as a mortar, a mortar mixer, a ball mill, an attritor, a vibrating ball mill, a satellite ball mill, a planetary ball mill, a jet mill or a bead mill. Particularly, the use of a planetary ball mill enables homogeneous dispersion of the components.

The positive electrode material for a sodium-ion secondary battery according to the present invention is used as a positive electrode for a sodium-ion secondary battery by applying the positive electrode material onto a current collector formed of a metal foil, such as aluminum, copper or gold, drying it, and, if necessary, then firing it. Alternatively, it is possible to form the positive electrode material for a sodium-ion secondary battery according to the present invention into a sheet shape and then form thereon a current collector formed of a metal coating by sputtering, plating or other processes.

(Sodium-Ion Secondary Battery)

A sodium-ion secondary battery according to the present invention includes, in addition to the above positive electrode for a sodium-ion secondary battery, a negative electrode as a counter electrode and an electrolyte.

The negative electrode contains a negative electrode active material capable of absorbing and releasing sodium ions during charge and discharge. Examples of the negative electrode active material that can be used include metallic materials, such as metallic Na, metallic Sn, metallic Bi, metallic Zn, Sn—Cu alloy, and Bi—Cu alloy, carbon materials, such as hard carbon, and oxide materials containing Ti and/or Nb as an element. Preferred among them are oxide materials containing Ti and/or Nb as an element because they have high safety and are rich as resources. Particularly preferably used are oxide materials containing a crystalline phase represented by $Na_4TiO(PO_4)_2$ or $Na_5Ti(PO_4)_3$ that has a redox potential of 1.5 V or less (vs. $Na/Na^+$) during charge and discharge. In this case, the operating voltage of the sodium-ion secondary battery becomes high, so that dendrites of metallic Na can be inhibited from precipitating during repeated charge and discharge.

Electrolytes that can be used include an aqueous electrolyte, a nonaqueous electrolyte, and a solid electrolyte. Nonaqueous electrolytes or solid electrolytes have wide potential windows and, therefore, produce little gas due to electrolyte decomposition during charge and discharge, so that the safety of the sodium-ion secondary battery can be increased. Among them, solid electrolytes are preferred because of their non-flammability.

Aqueous electrolytes contain a water-soluble electrolyte salt. Examples of the electrolyte salt include $NaNO_3$, $Na_2SO_4$, NaOH, NaCl, and $CH_3COONa$. These electrolyte salts may be used singly or in a mixture of two or more of them. The electrolyte salt concentration is appropriately adjusted, generally, within a range of 0.1M to the saturation concentration.

Note that in using an aqueous electrolyte, the redox potential of the positive electrode active material for a sodium-ion secondary battery according to the present invention can be used only within the potential window of water.

Nonaqueous electrolytes contain: an organic solvent and/or an ionic liquid both of which are nonaqueous solvents; and an electrolyte salt dissolved in the nonaqueous solvent. No particular limitation is placed on the type of the organic solvent as the nonaqueous solvent, and examples include propylene carbonate (PC), ethylene carbonate (EC), 1,2- dimethoxyethane (DME) γ-butyrolactone (GBL), tetrahydrofuran (THF), 2-methyltetrahydrofuran (2-MeHF), 1,3-dioxolan, sulfolane, acetonitrile (AN), diethyl carbonate (DEC), dimethyl carbonate (DMC), methylethyl carbonate (MEC), and dipropyl carbonate (DPC). These nonaqueous solvents may be used singly or in a mixture of two or more of them. Among them, propylene carbonate is preferred because of its excellent low-temperature characteristics.

No particular limitation is also placed on the type of the ionic liquid so long as it can dissolve an electrolyte salt used, and specific examples include: aliphatic quaternary ammonium salts, such as N,N,N-trimethyl-N-propyl ammonium bis(trifluoromethanesulfonyl)imide [abbr. TMPA-TFSI], N-methyl-N-propylpiperidinium bis(trifluoromethanesulfonyl)imide [abbr. PP13-TFSI], N-methyl-N-propylpyrrolidinium bis(trifluoromethanesulfonyl)imide [abbr. P13-TFSI], and N-methyl-N-butylpyrrolidinium bis(trifluoromethanesulfonyl)imide [abbr. P14-TFSI]; and quaternary alkylimidazolium salts, such as 1-methyl-3-ethylimidazolium tetrafluoroborate [abbr. EMIBF4], 1-methyl-3-ethylimidazolium bis(trifluoromethanesulfonyl)imide [abbr. EMITFSI], 1-allyl-3-ethylimidazolium bromide [abbr. AEImBr], 1-allyl-3-ethylimidazolium tetrafluoroborate [abbr. AEImBF4], 1-allyl-3-ethylimidazolium bis(trifluoromethanesulfonyl)imide [abbr. AEImTFSI], 1,3-diallylimidazolium bromide [abbr. AAImBr], 1,3-diallylimidazolium tetrafluoroborate [abbr. AAImBF4], and 1,3-diallylimidazolium bis(trifluoromethanesulfonyl)imide [abbr. AEImTFSI].

Examples of the electrolyte salt include sodium salts of $PF_6^-$, $BF_4^-$, $(CF_3SO_2)_2N^-$ (bis(trifluoromethanesulfonyl)amide, commonly called TFSI), $CF_3SO_3^-$ (commonly called TFS), $(C_2F_5SO_2)_2N^-$ (bis(pentafluoroethanesulfonyl)amide, commonly called BETI), $ClO_4^-$, $AsF_6^-$, $SbF_6^-$, bis(oxalato) boric acid ($B(C_2O_4)_2^-$, commonly called BOB), and difluoro (trifluoro-2-oxide-2-trifluoro-methyl propionate(2-)-0,0)boric acid ($BF_2OCOOC(CF_3)^{3-}$, commonly called B(HHIB)). These electrolyte salts may be used singly or in a mixture of two or more of them. Particularly preferred are sodium salts of $PF_6^-$ and $BF_4^-$, which are inexpensive. The electrolyte salt concentration is appropriately adjusted, generally, within a range of 0.5M to 3M.

The nonaqueous electrolyte may contain an additive, such as vinylene carbonate (VC), vinylene acetate (VA), vinylene butyrate, vinylene hexanoate, vinylene crotonate or catechol carbonate. These additives serve to form a protective film on the surface of the active material. The concentration of additive is, relative to 100 parts by mass of nonaqueous electrolyte, preferably 0.1 to 3 parts by mass and particularly preferably 0.5 to 1 part by mass.

Solid electrolytes that can be used are as described previously. Solid electrolytes have wide potential windows as compared to aqueous and nonaqueous electrolytes and, therefore, produce little gas due to decomposition, so that the safety of the sodium-ion secondary battery can be increased. Therefore, the positive electrode active material for a sodium-ion secondary battery according to the present invention is also most preferably used as a positive electrode active material for an all-solid-state sodium-ion secondary battery in which a solid electrolyte is used.

In the case of a sodium-ion secondary battery based on an electrolytic solution in which an aqueous electrolyte or a nonaqueous electrolyte is used, a separator is preferably provided between the electrodes. The separator is made of a material having insulation properties and specific examples of the material that can be used include: porous film or non-woven fabric obtained from a polymer, such as polyolefin, cellulose, polyethylene terephthalate or vinylon; non-woven glass fabric containing fibrous glass; glass cloth in which fibrous glass is woven; and film-like glass.

Examples

Hereinafter, a description will be given in detail of the present invention with reference to its working examples, but the present invention is not at all limited by the following working examples.

Tables 1 and 2 show working examples (Nos. 1 to 5) of the present invention and comparative examples (Nos. 6 to 9).

TABLE 1

| | | 1 | 2 | 3 | 4 | 5 |
|---|---|---|---|---|---|---|
| Composition | $Na_2O$ | 30.3 | 26 | 26 | 33.3 | 28.6 |
| (by mole %) | CoO | 36.4 | 40.7 | 37 | 33.3 | 42.8 |
| | $P_2O_5$ | 33.3 | 33.3 | 37 | | 28.6 |
| | $SiO_2$ | | | | 33.3 | |
| Type of Precipitated Crystal | | $Na_{3.64}Co_{2.18}(P_2O_7)_2$ | $Na_{3.12}Co_{2.44}(P_2O_7)_2$ | $Na_{5.6}Co_4(P_2O_7)_4$ | $Na_2CoSiO_4$ | $Na_4Co_3(PO_4)_2(P_2O_7)$ |
| *Characters in [ ] represent a general formula normalized to give 1 for the factor of Co. | | $[Na_{1.67}CoP_{1.83}O_{6.42}]$ | $[Na_{1.29}CoP_{1.64}O_{5.74}]$ | $[Na_{1.4}CoP_2O_7]$ | $[Na_2CoSiO_4]$ | $[Na_{1.33}CoP_{1.33}O_5]$ |
| Crystal Structure | | triclinic | triclinic | triclinic | monoclinic | orthorhombic |
| Space Group | | P-1 | P-1 | P-1 | Pn | Pn21a |
| Amorphous Content (% by mass) | | 18 | 8 | 18 | 4 | 5 |
| Electrolytic Solution-Based Cell | Discharge Capacity (mAh/g) | 79 | 83 | 78 | 81 | 89 |
| | Average Voltage (V) | 4.07 | 4.09 | 4.08 | 3.7 | 4.04 |
| | Energy Density (Wh/kg) | 322 | 339 | 318 | 300 | 360 |
| All-Solid-State Cell | Discharge Capacity (mAh/g) | 83 | 91 | 86 | | |
| | Average Voltage (V) | 4.3 | 4.3 | 4.31 | Not measured | Not measured |
| | Energy Density (Wh/kg) | 357 | 391 | 371 | | |

TABLE 2

|  |  | 6 | 7 | 8 | 9 |
|---|---|---|---|---|---|
| Composition (by mole %) | Na$_2$O | 33.3 | 33 | 28.6 | 28.6 |
|  | CoO |  |  |  | 42.8 |
|  | FeO | 33.3 |  |  |  |
|  | NiO |  | 33.3 | 42.8 |  |
|  | P$_2$O$_5$ | 33.3 | 33.3 | 28.6 | 28.6 |
| Type of Precipitated Crystal |  | Na$_2$FeP$_2$O$_7$ | Na$_2$NiP$_2$O$_7$ | Na$_4$Ni$_3$(PO$_4$)$_2$(P$_2$O$_7$) | Na$_4$Co$_3$(PO$_4$)$_2$(P$_2$O$_7$) |
| *Characters in [ ] represent a general formula normalized to give 1 for the factor of Fe, Ni, Co. |  | [Na$_2$FeP$_2$O$_7$] | [Na$_2$NiP$_2$O$_7$] | [Na$_{1.33}$NiP$_{1.33}$O$_5$] | [Na$_{1.33}$CoP$_{1.33}$O$_5$] |
|  | Crystal Structure | triclinic | triclinic | orthorhombic | orthorhombic |
|  | Space Group | P-1 | P-1 | Pn21a | Pn21a |
| Amorphous Content (% by mass) |  | 12 | 5 | 0 | 0 |
| Electrolytic Solution-Based Cell | Discharge Capacity (mAh/g) | 88 | 49 | 53 | 68 |
|  | Average Voltage (V) | 2.87 | 4.6 | 4.56 | 4.03 |
|  | Energy Density (Wh/kg) | 253 | 225 | 242 | 274 |
| All-Solid-State Cell | Discharge Capacity (mAh/g) | 65 | 51 | inoperative | inoperative |
|  | Average Voltage (V) | 2.63 | 4.67 |  |  |
|  | Energy Density (Wh/kg) | 171 | 238 |  |  |

Sodium-Ion Secondary Cell Using Nonaqueous Electrolyte (Electrolytic Solution-Based Cell)

(1) Production of Positive Electrode Active Material (1-a) Nos. 1 to 7 (Production by Melting Process)

Using sodium carbonate, sodium metaphosphate, cobalt oxide (CoO), iron oxide (Fe$_2$O$_3$), nickel oxide (NiO), and orthophosphoric acid as raw materials, powders of the raw materials were formulated to give each composition described in Nos. 1 to 7 shown in Tables 1 and 2. The raw material powders were loaded into a quartz crucible and melted at 1250° C. for 60 minutes in an air atmosphere using an electric furnace. Next, the resultant molten glass was poured between a pair of rotating rollers and formed into a shape with rapid cooling, thus obtaining a film-like glass body having a thickness of 0.1 to 2 mm. The film-like glass body was ground with a ball mill and then air-classified to obtain a glass powder having an average particle diameter of 2 μm.

An amount of 100 parts by mass of glass powder obtained in the above manner was mixed well with 21.4 parts by mass (corresponding to 12 parts by mass in terms of carbon) of polyethylene oxide nonylphenyl ether (HLB value: 13.3, weight average molecular weight: 660), which is a non-ionic surfactant, as a carbon source and 10 parts by mass of ethanol, followed by drying at 100° C. for about an hour. Thereafter, the mixture was fired in a nitrogen atmosphere at 700° C. for an hour to carbonize the non-ionic surfactant and concurrently crystallize the powder, thus obtaining a positive electrode active material the surface of which was coated with carbon. The obtained material was pulverized with a ball mill and then air-classified to obtain a positive electrode active material powder having an average particle diameter of 2 μm.

The obtained positive electrode active material powder was subjected to powder X-ray diffraction measurement and Rietveld analysis to identify its crystal structure and space group. In addition, the content of amorphous therein was determined by the previously described method. The results are shown in Tables 1 and 2. Furthermore, the XRD pattern of sample No. 1 is shown in FIG. 1. Note that the XRD pattern of a crystalline phase is also shown in the lower side of FIG. 1. The lattice parameters determined by refinement using the Rietveld analysis were as follows: a=10.306 angstrom, b=13.123 angstrom, c=8.609 angstrom, α=93.980°, δ=104.04°, and γ=92.07°.

(1-b) Nos. 8 and 9 (Production by Solid Reaction Process)

Sodium carbonate, sodium metaphosphate, cobalt oxide, nickel oxide, and orthophosphoric acid were weighed to give each composition described in Nos. 8 and 9 of Table 2, thus preparing a raw material batch. The raw material batch was mixed in ethanol using a planetary ball mill and then dried at 100° C. The dried raw material batch was pre-fired in an electric furnace at 900° C. for six hours and thus degassed. The pre-fired raw material batch was pressed into a shape at 500 kgf/cm$^2$ and then fired in an air atmosphere at 800° C. for 12 hours. The obtained sintered body was ground for 12 hours with a ball mill using 20-mm diameter ZrO$_2$ balls and the ground product was air-classified to obtain a powdered solid reactant having an average particle diameter D$_{50}$ of 2 μm.

An amount of 100 parts by mass of powdered solid reactant obtained in the above manner was mixed well with 21.4 parts by mass (corresponding to 12 parts by mass in terms of carbon) of polyethylene oxide nonylphenyl ether (HLB value: 13.3, weight average molecular weight: 660), which is a non-ionic surfactant, as a carbon source and 10 parts by mass of ethanol, followed by drying at 100° C. for about an hour. Thereafter, the mixture was fired in a nitrogen atmosphere at 700° C. for an hour to carbonize the non-ionic surfactant, thus obtaining a positive electrode active material powder the surface of which was coated with carbon.

The obtained positive electrode active material powder was determined in terms of crystal structure, space group, and amorphous content by the same methods as described previously. The results are shown in Table 2.

(2) Production of Positive Electrode

Acetylene black (Super C65 manufactured by Timcal) as a conductive agent and poly(vinylidene fluoride) as a binder were weighed and mixed with the positive electrode active material powder obtained in the above manner to give a ratio of positive electrode active material powder to conductive agent to binder of 90:5:5 (mass ratio) and the mixture was dispersed into N-methylpyrrolidinone, followed by well stirring with a planetary centrifugal mixer to form a slurry, thus obtaining a positive electrode material.

Next, the obtained positive electrode material was coated on a 20-μm thick aluminum foil serving as a positive electrode current collector using a doctor blade with a gap of 125 μm, and the aluminum foil with the positive electrode material was vacuum-dried by a dryer at 70° C. and then pressed by passing it between a pair of rotating rollers to obtain an electrode sheet. This electrode sheet was punched out into an 11-mm diameter disc by an electrode cutting machine and dried at a temperature of 150° C. for eight hours under reduced pressure, thus obtaining a circular positive electrode.

(3) Production of Test Cell

Each test cell for a sodium-ion secondary battery was produced in the following manner. The positive electrode obtained in the above manner was placed, with its aluminum foil surface down, on a lower lid of a coin cell, and a separator formed of a 16-mm diameter polypropylene porous film dried at 70° C. for eight hours under reduced pressure, a metallic sodium layer as a counter electrode, and an upper lid of the coin cell were laid one after another on the positive electrode, thus producing a test cell. A 1M $NaPF_6$ solution/EC:DEC=1:1 (where EC is ethylene carbonate and DEC is diethyl carbonate) was used as an electrolytic solution. The assembly of the test cell was conducted in an environment of a dew-point minus 70° C. or below.

(4) Charge and Discharge Test

Each test cell was CC (constant-current) charged at 30° C. from an open circuit voltage to 5.1 V and its amount of electricity charged to the positive electrode active material per unit mass (first charge capacity) and the average voltage were determined. Next, the test cell was CC discharged from 5.1 V to 2 V and its amount of electricity discharged from the positive electrode active material per unit mass (first discharge capacity) and the average voltage were determined. The C-rate was 0.1 C.

The results of the charge and discharge characteristics are shown in Tables 1 and 2. In the tables, "Discharge Capacity" refers to the first discharge capacity, "Average Voltage" refers to the average operating voltage during the first discharge, and "Energy Density" refers to the product of discharge capacity and average voltage.

As is obvious from Tables 1 and 2, as for Nos. 1 to 5 which are working examples, the discharge capacity was 78 to 89 mAh/g, the average voltage was 3.7 to 4.09 V, and the energy density was thus as high as 300 to 360 Wh/kg. On the other hand, No. 6, which is a comparative example, exhibited a low average voltage of 2.87 V and Nos. 7 to 9, which are comparative examples, exhibited low discharge capacities of 49 to 68 mAh/g, so that the energy densities of Nos. 6 to 9 were 225 to 274 Wh/kg, which were poor as compared to the working examples.

Sodium-Ion Secondary Cell Using Solid Electrolyte (all-Solid-State Cell)

(1) Preparation of Positive Electrode Active Material Precursor Powder

Using sodium carbonate, sodium metaphosphate, cobalt oxide (CoO), iron oxide ($Fe_2O_3$), nickel oxide (NiO), and orthophosphoric acid as raw materials, powders of the raw materials were formulated to give each composition described in Nos. 1 to 3, 6, and 7 shown in Tables 1 and 2. The raw material powders were loaded into a quartz crucible and melted at 1250° C. for 60 minutes in an air atmosphere using an electric furnace. Next, the resultant molten glass was poured between a pair of rotating rollers and formed into a shape with rapid cooling, thus obtaining a film-like glass body having a thickness of 0.1 to 2 mm. This film-like glass body was ground for 10 hours with a ball mill using 20-mm diameter $ZrO_2$ balls and the ground product was passed through a resin-made sieve with 120-μm openings to obtain a coarse glass powder having an average particle diameter of 7 μm. Furthermore, the coarse glass powder was ground, using ethanol as a grinding aid, for 80 hours with a ball mill using 3-mm diameter $ZrO_2$ balls, thus obtaining a glass powder (positive electrode active material precursor powder) having an average particle diameter of 0.5 μm. As a result of XRD measurement, the glass powder was confirmed to be amorphous.

(2) Preparation of Sodium Ion-Conductive Solid Electrolyte

A $Li_2O$-stabilized β" alumina having a composition formula of $Na_{1.6}Li_{0.34}Al_{10.66}O_{17}$ (manufactured by Ionotec Ltd.) was processed by dry grinding to a thickness of 0.2 mm, thus obtaining a solid electrolyte sheet. Furthermore, another solid electrolyte sheet thus obtained was ground with a planetary ball mill and the ground product was air-classified, thus preparing a solid electrolyte powder (having an average particle diameter of 1.5 μm). The above preparations of the solid electrolyte sheet and powder were conducted in an environment of a dew point minus 50° C. or below for the purpose of preventing degradation due to moisture absorption.

(3) Production of Solid-State Sodium-Ion Secondary Cell

As for Nos. 1 to 3, 6, and 7, the positive electrode active material precursor powder and solid electrolyte powder obtained in the above (1), and acetylene black (Super C65 manufactured by Timcal) as a conductive agent were weighed in a ratio of 72:25:3 (mass ratio) and mixed for 60 minutes using an agate mortar and an agate pestle, thus obtaining a mixed powder. As for Nos. 8 and 9, a mixed powder was obtained likewise, except that, instead of the positive electrode active material precursor powder, the powdered solid reactant produced in the course of production of the electrolytic solution-based cell described above. Added to 100 parts by mass of the obtained mixed powder were 10 parts by mass of polypropylene carbonate and additionally 40 parts by mass of anhydrous N-methylpyrrolidinone. The mixture was stirred well with a planetary centrifugal mixer to form a slurry.

The obtained slurry was applied, with an area of 1 $cm^2$ and a thickness of 70 μm, to one side of the above-described solid electrolyte sheet and then dried at 70° C. for three hours. Next, the product was put into a carbon container and fired, under firing conditions at 500° C. for 30 minutes in a nitrogen atmosphere as for No. 1, at 550° C. for 30 minutes in a nitrogen atmosphere as for No. 2, at 530° C. for 30 minutes in a nitrogen atmosphere as for No. 3, at 550° C. for 30 minutes in an atmosphere of nitrogen and hydrogen (96% and 4% by volume, respectively) as for No. 6, at 550° C. for 30 minutes in a nitrogen atmosphere as for No. 7, and at 650° C. for 30 minutes in a nitrogen atmosphere as for Nos. 8 and 9, to crystallize the positive electrode active material precursor powder, thus forming a positive electrode layer. All the above operations were conducted in an environment of a dew point minus 50° C. or below.

When the powder X-ray diffraction patterns of the materials making up each of the positive electrode layers were checked, diffraction lines originating from the crystals described in Tables 1 and 2 were confirmed. Furthermore, regarding all the positive electrodes, respective crystalline diffraction lines originating from the solid electrolyte powders used were confirmed.

Next, a current collector formed of a 300-nm thick gold electrode was formed on the surface of the positive electrode layer using a sputtering device (SC-701AT manufactured by Sanyu Electron Co., Ltd.). Furthermore, in an argon atmosphere of a dew point minus 70° C. or below, metallic sodium serving as a counter electrode was pressure-bonded to the surface of the solid electrolyte layer opposite to the surface thereof on which the positive electrode layer was formed. The obtained laminate was placed on a lower lid of a coin cell and covered with an upper lid to produce a CR2032-type test cell.

(4) Charge and Discharge Test

Each of the produced test cells was CC (constant-current) charged at 60° C. from an open circuit voltage to 5.0 V and its amount of electricity charged to the positive electrode active material per unit mass (first charge capacity) and the average voltage were determined. Next, the test cell was CC discharged from 5.0 V to 2 V and its amount of electricity discharged from the positive electrode active material per unit mass (first discharge capacity) and the average voltage were determined. In this test, evaluation was made at a C-rate of 0.01 C. The results are shown in Tables 1 and 2 and FIG. 2 shows first charge and first discharge curves of a solid-state sodium-ion secondary cell in which sample No. 1 is used.

As is obvious from Tables 1 and 2, as for Nos. 1 to 3 which are working examples, the discharge capacity was 83 to 91 mAh/g, the average voltage was 4.3 to 4.31 V, and the energy density was thus as high as 357 to 391 Wh/kg. On the other hand, No. 6, which is a comparative example, exhibited a low average voltage of 2.63 V and No. 7, which is a comparative example, exhibited a low discharge capacity of 51 mAh/g, and the energy densities of Nos. 6 and 7 were thus 171 and 238 Wh/kg, respectively, which were poor as compared to the working examples. Furthermore, the cells of Nos. 8 and 9 were inoperative.

INDUSTRIAL APPLICABILITY

The positive electrode active material for a sodium-ion secondary battery according to the present invention is suitable for sodium-ion secondary batteries used in portable electronic devices, electric vehicles, electric power tools, backup emergency power supplies, and so on.

The invention claimed is:

1. A positive electrode active material for a sodium-ion secondary battery, the positive electrode active material containing crystals having at least one crystal structure selected from monoclinic, triclinic, and orthorhombic crystal structures and including, in terms of % by mole of oxide, 25 to 35% $Na_2O$, 30 to 45% CoO, and 28 to 38% $P_2O_5+SiO_2+B_2O_3$, and an amorphous phase, in terms of % by mass, 1% or more and 30% or less.

2. The positive electrode active material for a sodium-ion secondary battery according to claim 1, the crystals having a crystal form represented by a general formula $Na_x(Co_{1-a}M_a)A_yO_z$ (where M represents at least one selected from the group consisting of Cr, Fe, Mn, and Ni, A represents at least one selected from the group consisting of P, Si, and B, $0.5 \leq x \leq 4.1$, $0.65 \leq y \leq 6.5$, $2.5 \leq z \leq 20$, and $0 \leq a \leq 0.9$).

3. The positive electrode active material for a sodium-ion secondary battery according to claim 1, wherein the crystals belong to at least one space group selected from P-1, P1, Cm, Pna21, and P21/n.

4. A positive electrode material for a sodium-ion secondary battery, the positive electrode material containing the positive electrode active material for a sodium-ion secondary battery according to claim 1.

5. The positive electrode material for a sodium-ion secondary battery according to claim 4, the positive electrode material further containing a conductive agent.

6. The positive electrode material for a sodium-ion secondary battery according to claim 4, the positive electrode material further containing a sodium ion-conductive solid electrolyte.

7. The positive electrode material for a sodium-ion secondary battery according to claim 6, wherein the sodium ion-conductive solid electrolyte is beta-alumina or NASICON crystals.

8. The positive electrode material for a sodium-ion secondary battery according to claim 4, the positive electrode material containing, in terms of % by mass, 30 to 100% the positive electrode active material for a sodium-ion secondary battery, 0 to 20% conductive agent, and 0 to 70 sodium ion-conductive solid electrolyte.

9. A positive electrode for a sodium-ion secondary battery, wherein the positive electrode material for a sodium-ion secondary battery according to claim 4 is used.

10. A sodium-ion secondary battery comprising the positive electrode for a sodium-ion secondary battery according to claim 9.

11. A method for producing the positive electrode active material for a sodium-ion secondary battery according to claim 1, the method comprising the steps of:
melting a raw material batch to obtain a melt; and
cooling the melt to obtain a glass body.

12. The method for producing the positive electrode active material for a sodium-ion secondary battery according to claim 11, the method further comprising the step of firing the glass body to crystallize the glass body.

13. The method for producing the positive electrode active material for a sodium-ion secondary battery according to claim 12, wherein the glass body is fired together with at least one selected from an electrically conductive carbon, a source of electrically conductive carbon, and a sodium ion-conductive solid electrolyte.

* * * * *